April 4, 1950         B. STADE         2,503,223
HOSE CLAMP
Filed June 4, 1945
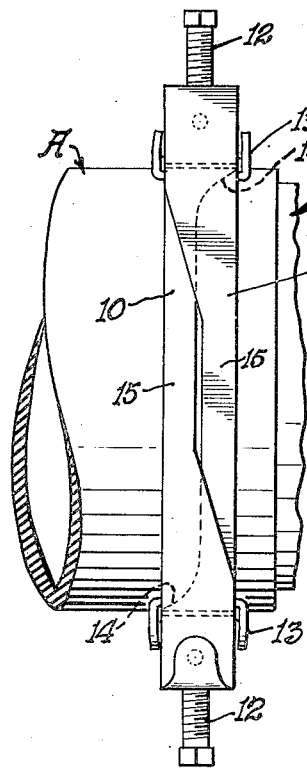
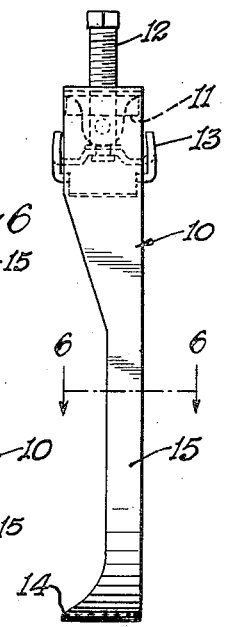
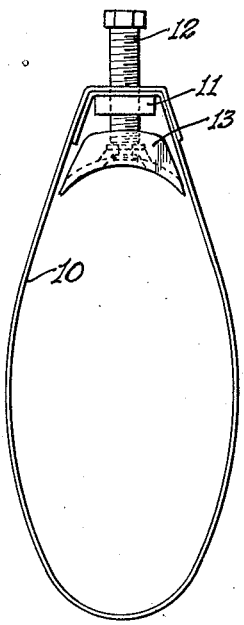
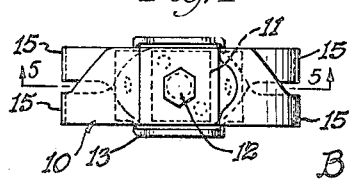
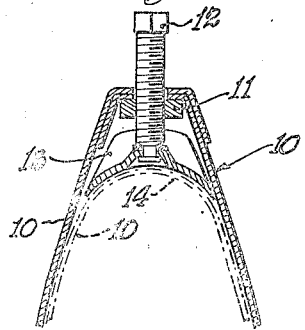
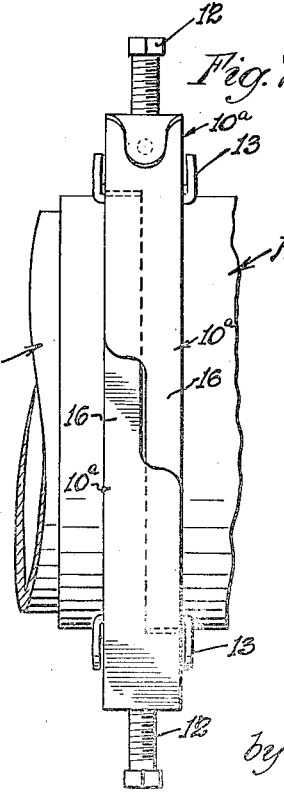
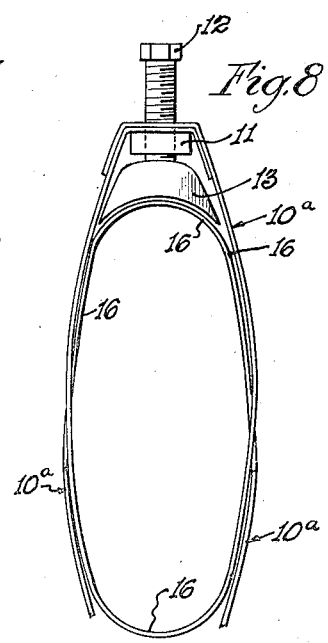
Inventor
Bertil Stade
by Frank J. Schraeder Jr.
Attorney.

Patented Apr. 4, 1950

2,503,223

UNITED STATES PATENT OFFICE 2,503,223

HOSE CLAMP

Bertil Stade, Elmwood Park, Ill., assignor to Wittek Manufacturing Co., Chicago, Ill., a corporation of Illinois Application June 4, 1945, Serial No. 597,443

3 Claims. (Cl. 24—19)

This invention relates to clamps adapted to be used in pairs for doubly securing a flexible or semi-flexible tubular member as, for example, a hose, to another tubular member, such as a pipe or any other tubular fluid inlet or outlet element; and it has for its object to produce a simple, novel and highly efficient clamp for this purpose.

One of the best clamps now in use, for clamping a hose or the like about a member extending into the same, consists of a flexible metal band arranged in the form of a closed loop, together with a screw extending through the band radially of the loop; the screw having on the end within the loop an arcuate bridge which bears against the hose or other object surrounded by the loop. Viewed in one of its aspects, the present invention may be said to have for its object so to modify this prior art clamp that two such clamps may, in effect, be in the same place at the same time.

In carrying out the invention, the band elements of the clamps are shaped to have different widths at different points in their lengths, so that two oppositely-disposed, identical clamps may be interengaged with their screws axially aligned and coinciding with a diameter or axis common to both loops. Therefore, in one of its aspects, the present invention may be said to have for its object to make it possible to apply two identical clamps of the closed loop type to an object in such relative positions that the forces to which the object is subjected by one clamp are opposite to and balanced by those created by the other clamp.

Viewed in another of its aspects, the present invention may be said to have for its object to cause a part of the band element of each clamp to serve as a shield or guard and as a pressure distributer device between the bridge of the other clamp and the hose or other flexible member.

Where the tubular members to be clamped in telescoped relation to each other are oval, it is more difficult to secure a good joint than is the case with round members. Since the present invention permits oval members to be connected just as easily and as effectively as are round members, the present invention may be said to have for an object to produce a clamping means that overcomes the difficulties encountered with prior devices in connecting together oval tubular members.

The various features of novelty whereby the present invention is characterized will hereinafter be pointed out with particularity in the claims; but, for a full understanding of the invention and its objects and advantages, reference may be had to the following detailed description taken in connection with the accompanying drawing, wherein:

Figure 1 is a side or face view of a pair of clamps embodying the present invention, applied to two telescoped members of which fragments are shown; Fig. 2 is a side or face view of one of the two clamps appearing in Fig. 1; Fig. 3 is an end view of the clamp appearing in Fig. 2; Fig. 4 is a top plan view of the clamps by themselves, as they appear in Fig. 1; Fig. 5 is a section on line 5—5 of Fig. 4, a portion of one clamp being shown in full lines and the adjacent loop portion of the other being in broken lines; Fig. 6 is a section on line 6—6 of Fig. 2; Fig. 7 is a view similar to Fig. 1, illustrating a slight modification; and Fig. 8 is an end view of the two clamps appearing in Fig. 7, a portion of one of the clamps being broken away.

For the purpose of illustration the clamp disclosed in Patent No. 2,278,337 has been selected for modification to produce a satisfactory embodiment of the present invention, and the detailed description will be confined to this particular embodiment; but it will be understood that those elements of the clamp which are old may take any desired forms.

Referring to Figs. 1–6 of the drawing, A and B are two telescoped, tubular members to be connected together by surrounding clamping means. In accordance with the present invention, two identical clamps are employed. Each clamp comprises a band 10 of flexible metal, the ends of which are overlapped and overlie and are welded to a nut 11. This creates a closed loop which may be preformed into any desired shape, an oval shape being shown. A screw 12 extends through the overlapped loop ends and through the nut, radially of the loop, namely, with its long axis coinciding with the long axis of the oval. On the inner end of the screw is a bridge 13.

The parts just described constitute a complete clamp which, by itself, operates in the old way. In accordance with the present invention, the metal of the band is cut away for one half of its width, and preferably a little more, through a large portion of its length, but leaving a short section 14, directly opposite the bridge, intact. Thus the sides of the loop consist, in the main, of narrow strips 15. This permits a pair of the clamps to be interlocked in telescoped relation to each other, within a space no wider than the width of one of the bands, as shown in Figs. 1, 4 and 7. The composite clamp is a little longer in the axial direction than one clamp, alone, because the screws are at opposite poles. When so interlocked, the section of each loop having therein the wide part or tab 14 lies within the other loop, with the tab registering with the bridge in that loop.

When a pair of these interlocked clamps are applied to the tubular members A and B, as shown, the two screws are in axial alignment, and between each bridge and the outer tubular member there is interposed the tab 14 on the other clamp. Therefore, the thrust of each screw on the tubular members is along the same diameter or axis of the latter, but in opposite directions, so that neither clamp tends to disturb, but only to improve, the tightness of the joint created by the other. Obviously this pull of the screws in opposite directions causes the loops to move bodily relatively to each other, the portions of the loops that overlap each other, as shown in Fig. 5, sliding on each other. Should one clamp become ineffective, the other will still hold without being placed off balance by the loss of support from the other. Furthermore, the tabs or unmultilated parts 14 of the loops serve effectively as protecting shields and pressure distributers between the bridges and the outer tubular member, the bridges having no direct contact with the latter. Accordingly no care need be taken to provide the bridges with smooth working faces to guard against injury to hoses or the like which would otherwise come in direct contact therewith.

Since a substantial part of each narrow strip section 15 underlies a wider portion of the band element of the other clamp, it is thus reenforced to some extent and held more firmly against the tubular member which it surrounds than would otherwise be true.

It will thus be seen that the present invention makes it possible, without keeping on hand more than one style of clamp, to use two clamps to surround an object, with the pressure screws disposed on opposite sides of said object and having their axes in alignment to secure a balancing of pressures or forces, and with the clamps occupying no more space transversely of the plane of the clamps than is requires for a single clamp. It will also be seen that it is a simple matter to apply the two clamps to the thing or things to be held thereby, the interengagement being effected either before or after being slipped on the latter.

It will further been seen that because an object of oval shape is held in what are, in effect, oppositely-disposed slings into each of which the rounded portion at one end of the long axis of the oval fits snugly, a much tighter fit around the entire periphery of the oval is obtained than is possible with a single clamp.

The clamp in Figs. 7 and 8 differ from that heretofore described only in that the excision in each band 10a extends uninterruptedly from a point on one side of and not far from the overlapping ends to a corresponding point on the other side; each band having a continuous narrow section or strip 16 and no part corresponding to the tab 14 in the other form. The operation, in use, is the same in both instances, the only difference being that each bridge rests for only a part of its width on the band element of the other clamp.

While there has been illustrated and described with particularity only a single preferred embodiment of the present invention, together with a slight modification, it is not desired to limit the invention to the exact details thus illustrated and described; but the intention is to cover all forms and arrangements coming within the definitions of the invention constituting the appended claims.

I claim:

1. A double clamp device comprising two identical clamps each including a band formed into a loop and a means to tighten the band about an object, each band having, directly opposite the corresponding tightening means, a wide portion that terminates at each end in a narrow portion, and said clamps being interengaged with the aforesaid wide portion of each lying within the loop of the other clamp and in registration with the tightening means of the latter clamp.

2. A double clamp device comprising two identical clamps each including a band formed into a loop and a screw to tighten the band about an object, each band having on opposite sides of and at some distance from the screw a wide portion that terminates at each end in a narrow portion, and said clamps being interengaged with the aforesaid wide portion of each lying within the loop of the other beneath and in registration with the tightening means for the latter loop.

3. A double clamp device comprising two identical clamps each composed of a band formed into a loop and provided with means, including a bridge within the loop to press against an object surrounded by the loop, to tighten the band about such object; each band having, directly opposite the corresponding tightening means, a wide portion that terminates at each end in a narrow portion; and said clamps being interengaged with the aforesaid wide portion of each lying within the loop and under the bridge of the other clamp.

BERTIL STADE.

REFERENCES CITED

The following references are of record in the file of this patent:

UNITED STATES PATENTS

| Number | Name | Date |
| --- | --- | --- |
| 1,155,646 | D'Arcy | Oct. 5, 1915 |
| 1,413,003 | Chaloupka | Apr. 18, 1922 |
| 2,278,337 | Tetzlaff | Mar. 31, 1942 |